(12) United States Patent
Berndt et al.

(10) Patent No.: US 11,345,046 B2
(45) Date of Patent: May 31, 2022

(54) GRIPPING UNIT AND COMPONENT AS WELL AS RELEASABLE CONNECTION OF BOTH

(71) Applicant: Mahle International GmbH, Stuttgart (DE)

(72) Inventors: Ralf Berndt, Ditzingen-Schoeckingen (DE); Anabel Gaule, Stuttgart (DE); Nico Held, Esslingen (DE); Frank Nastoll, Ostfildern (DE); Jochen Schaudt, Hechingen (DE)

(73) Assignee: Mahle International GmbH

( * ) Notice: Subject to any disclaimer, the term of this patent is extended or adjusted under 35 U.S.C. 154(b) by 183 days.

(21) Appl. No.: 16/783,780

(22) Filed: Feb. 6, 2020

(65) Prior Publication Data

US 2020/0254626 A1 Aug. 13, 2020

(30) Foreign Application Priority Data

Feb. 7, 2019 (DE) .......................... 102019201588.3

(51) Int. Cl.
*B25J 15/00* (2006.01)
*B25J 15/08* (2006.01)

(52) U.S. Cl.
CPC ........... *B25J 15/0033* (2013.01); *B25J 15/08* (2013.01)

(58) Field of Classification Search
CPC .... B25J 15/0033; B25J 15/08; B25J 15/0491; B25J 15/0425; B25J 15/0475; B25J 18/00; B25J 17/025
USPC ............................ 294/119.1, 106, 103.1, 116
See application file for complete search history.

(56) References Cited

U.S. PATENT DOCUMENTS

| 5,167,482 | A | * | 12/1992 | Cross | ............... | H01B 13/01236 29/453 |
| 5,947,539 | A | * | 9/1999 | Long | ...................... | B25J 15/026 294/119.1 |
| 6,000,688 | A | * | 12/1999 | Giangrasso | ............ | B23Q 3/104 269/252 |

(Continued)

FOREIGN PATENT DOCUMENTS

| DE | 102007049862 A1 | 4/2009 |
| EP | 3243627 A1 | 11/2017 |

OTHER PUBLICATIONS

German Search Report dated Jan. 29, 2020 for copending German Patent Appl. No. DE 10 2019 201 588.3.

*Primary Examiner* — Paul T Chin
(74) *Attorney, Agent, or Firm* — Fishman Stewart PLLC

(57) ABSTRACT

A gripping unit for the automated assembly of a component having at least one holding region may include at least one assembly gripper configured to grip the component in the at least one holding region. The at least one assembly gripper may include two gripping fingers that may be axially adjustable towards one another into a gripping position where the component is securable between the two gripping fingers, and that may be axially adjustable away from one another into a released position where the component is releasable from the two gripping fingers. The two gripping fingers may include a first gripping finger having a first gripping contour and a second gripping finger having a second gripping contour. The first gripping contour and the second gripping contour may be structured complimentary to the at least one holding region of the component.

20 Claims, 2 Drawing Sheets

(56) References Cited

U.S. PATENT DOCUMENTS

| | | | | |
|---|---|---|---|---|
| 6,077,280 | A | * | 6/2000 | Fossum ................ A61B 17/282 606/151 |
| 6,099,539 | A | * | 8/2000 | Howell ................ A61B 17/122 606/151 |
| 6,607,227 | B1 | * | 8/2003 | Morton .................. H01R 43/20 269/268 |
| 2014/0327260 | A1 | * | 11/2014 | Preston .................. B25J 15/009 294/119.1 |
| 2018/0057278 | A1 | * | 3/2018 | Kunihiro .............. B23Q 7/1494 |
| 2018/0370044 | A1 | * | 12/2018 | Zitting ..................... B25J 9/142 |

* cited by examiner

GRIPPING UNIT AND COMPONENT AS WELL AS RELEASABLE CONNECTION OF BOTH

CROSS-REFERENCE TO RELATED APPLICATIONS

This application claims priority to German Patent Application No. DE 10 2019 201 588.3, filed on Feb. 7, 2019, the contents of which is hereby incorporated by reference in its entirety.

TECHNICAL FIELD

The invention relates to a gripping unit for the automated assembly of a component, to the component and to a releasable connection of the gripping unit and of the component.

BACKGROUND

While producing multi-part components, multiple components that are configured differently from one another are frequently assembled to one another and if required also joined to one another. The assembly of the differently configured components is currently not possible with the same gripping unit because of the non-uniform geometry of the same. For this reason, the components during the assembly are assembled to one another either manually or with specially adapted gripping units. Disadvantageously, the manual assembly is cost-intensive and error-prone. Upon an automation of the assembly, many different tools have to be present so that this solution is economically also unattractive. In addition, no adequate assembly force can be introduced into the respective component by way of the conventional gripping units. Furthermore, a precise positioning and a centring of the component in the respective gripping unit is often not possible or problematic.

SUMMARY

The object of the invention therefore is to state improved or at least alternative embodiments for a gripping unit and for a component of the generic type, with which the described disadvantages are overcome. In particular, the automated assembly of the component is to be made possible with the same gripping unit regardless of its shape. There, an increased force transmission and a simplified centring is to be made possible.

According to the invention, this object is solved through the subject of the independent claim(s). Advantageous embodiments are subject of the dependent claim(s).

A gripping unit is provided for the automated assembly of a component with at least one holding region and comprises at least one assembly gripper. Here, the component is grippable by the assembly gripper in the respective holding region. The assembly gripper comprises a first gripping finger and a second gripping finger, which are axially moveable towards one another into a gripping position and axially away from one another into a released position. The holding region of the component is fixed in the gripping position between the two gripping fingers and releasable from the same in the released position. Here, the first gripping finger has a first gripping contour and the second gripping finger has a second gripping contour which is provided for the correspondingly designed holding region of the component. According to the invention, the first gripping contour and/or the second gripping contour project axially or are recessed axially at least in regions, so that the correspondingly formed holding region of the component in the gripping position can be fixed between the gripping fingers in a form-fitting manner.

Through the axially projecting or axially recessed gripping contours of the gripping fingers, the component is fixed in the gripping position in the assembly gripper in a form-fitting manner. By way of this, the force transmission into the component can be improved and despite a low holding force of the gripping fingers a high assembly force be transmitted to the component. Furthermore, the gripping contours make possible a centring of the assembly gripper on the component, as a result of which position and angular tolerances during the assembly can be significantly reduced. The holding region of the component can be relatively small in terms of area, so that technical characteristics of the component—such as for example flow characteristics or noise characteristics—remain nearly unchanged. By way of this, differently configured components—however with the identically configured holding regions—can be assembled by the same gripping unit in an automated manner. The holding region can be formed for example in one part with the component or be inserted in the component as a separate holding region part. Through the solution according to the invention, a higher degree of automation during the assembly can thus be achieved without additional costs being incurred through the conventionally necessary plurality of tools. Furthermore, the manual assembly is also superfluous, as a result of which errors during the assembly can be avoided and production costs reduced. Here, the component can be formed of metal and also of plastic.

In an advantageous configuration of the gripping unit it can be provided that in the gripping position the first gripping contour and the second gripping contour follow one another at a same interval. In other words, the two gripping contours in the gripping position form a gap with a constant width, in which the holding region of the component is arranged. By way of this, the component can have a constant wall thickness in the holding region. Because of the constant wall thickness, there is no distortion of the material during the production of the component and the producibility of the component—for example a component made of plastic by injection moulding—is ensured. In addition, the production of the suitably adapted holding region of the component influences the production duration of the component only insignificantly or not at all. Here, the holding region of the component can be relative small in terms of area, so that technical characteristics of the component—such as flow characteristics or noise characteristics—remain nearly unchanged.

Advantageously, the first gripping contour and the second gripping contour can each be formed by at least one recess and each by at least one projection. Here, the respective projection of the first gripping contour is located at least in the gripping position axially opposite the respective recess of the second gripping contour and vice versa. In other words, the respective projection in the gripping position is oriented coaxially to the respective recess. With an adequately thin wall thickness in the holding region, the respective projection can even axially engage in the respective recess. When the gripping contours comprise multiple recesses and/or multiple projections, the number of the recesses appropriately correspond to the number of the projections of the second gripping contour and the number of the projections of the first gripping contour correspond to the number of the recesses of the second gripping contour.

In an advantageous embodiment of the gripping contours it is provided that the first gripping contour and/or the second gripping contour each comprise two recesses and each two projections. The two recesses and the two projections on the first gripping contour and the two recesses and the two projections on the second gripping contour are each arranged diagonally relative to one another.

The respective recess and the respective projection can be semi-spherical or conical or truncated cone-like or pyramid-like or cuboid or cylindrical in shape or have a shape combined from these. Through this configuration, a canting of the gripping contours in the component can be prevented and the assembly gripper more easily centred on the component. The respective recess need not generally correspond to the shape of the associated projection and can receive the respective projection merely so as not to be axially and laterally displaceable. Thus it is conceivable for example that the recess is cylindrical and the associated projection is semi-spherical or truncated cone-shaped. Preferably, the shape of the respective recess however corresponds to the shape of the respective associated projection in order to be able to realise a constant wall thickness in the holding region.

The invention also relates to a component for the automated assembly by means of the gripping unit described above. In the at least one holding region, the component has a first counter contour for the first gripping contour on a first side and a second counter contour for the second gripping contour located opposite the first counter contour facing away from the first side. The first counter contour and/or the second counter contour project axially or are recessed axially at least in regions, so that in the gripping position the holding region of the component can be fixed between the gripping fingers in a form-fitting manner. Consequently, the first counter contour is matched to the first gripping contour of the first gripping finger and the second counter contour is matched to the second gripping contour of the second gripping finger, in particular designed complementarily thereto. In the gripping position, the first gripping contour of the first gripping finger then engages in the first counter contour of the component and the second gripping contour of the second gripping finger engages in the second counter contour of the component and the component is fixed in the assembly gripper in a form-fitting manner.

Through the advantageous configuration of the component, the force transmission from the gripping unit into the component can be improved and despite a low holding force of the gripping fingers, a high assembly force transmitted to the component. In addition, a centring of the assembly gripper on the component is possible in a simplified manner, as a result of which position and angular tolerances during the assembly can be reduced. The technical characteristics of the component—such as for example flow characteristics or noise characteristics—can, with a holding region remaining relatively small, remain nearly unchanged. Furthermore, differently configured components—however with identically configured holding regions—can be assembled in an automated manner by the same gripping unit. The component can preferentially be a flap for controlling a fluid flow—preferentially a gas flow and in particular an air flow.

Advantageously, the first counter contour and the second counter contour can follow one another at a same interval, so that the component in the holding region has a constant wall thickness. Because of this, the component can have a constant wall thickness in the holding region. Through the constant wall thickness there is no distortion of the material during the production of the component and the producibility of the component—for example a component made of plastic by injection moulding—is ensured. In addition, the production of the suitably adapted holding region of the component influences the production duration of the component only insignificantly. The holding region of the component can be relatively small in terms of area, so that technical characteristics of the component—such as for example flow behaviour or noise behaviour—remain nearly unchanged.

Advantageously, the first counter contour and the second counter contour can each be formed by at least one recess and each by at least one projection, wherein the respective projection of the first counter contour is located axially opposite the respective recess of the second counter contour and vice versa. The respective projection is then practically oriented coaxially to the respective recess. Depending on the wall thickness of the component in the holding region, the respective recess can axially project as far as into the respective projection. By way of this, the respective projection is quasi hollowed out by the respective recess. The first counter contour and the second counter contour can each comprise two recesses and each two projections, wherein the two recesses and the two projections on the first counter contour and the two recesses and the two projections on the second counter contour are each arranged diagonally to one another. The respective recess and the respective projection can be semi-circular or conical or truncated cone-like or pyramid-like or cuboid or cylindrical in shape. By way of this, a canting of the component in the assembly gripper can be prevented and the assembly gripper additionally centred on the component in a simplified manner.

The invention also relates to a releasable connection of the gripping unit described above and the component for the automated assembly of the component described above. Here, the first counter contour of the component in the gripping position engage in the first gripping contour of the first gripping finger and the second counter contour of the component in the second gripping contour of the second gripping finger and the component is fixed between the gripping fingers in the gripping position in a form-fitting manner. Preferentially, the counter contours are formed complementarily to the corresponding gripping contours. Then, the first counter contour of the component in the gripping position lies against the first gripping contour of the first gripping finger and the second counter contour of the component against the second gripping contour of the second gripping finger. In the established connection, the two gripping fingers are in the gripping position and the component is fixed between the gripping fingers in a form-fitting manner. In the released connection, the gripping fingers are in the released position and the component is releasable from the gripping fingers. The releasable connection of the gripping unit and the component produces multiple advantages which have already been thoroughly explained above.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically

DETAILED DESCRIPTION

Figure 1:
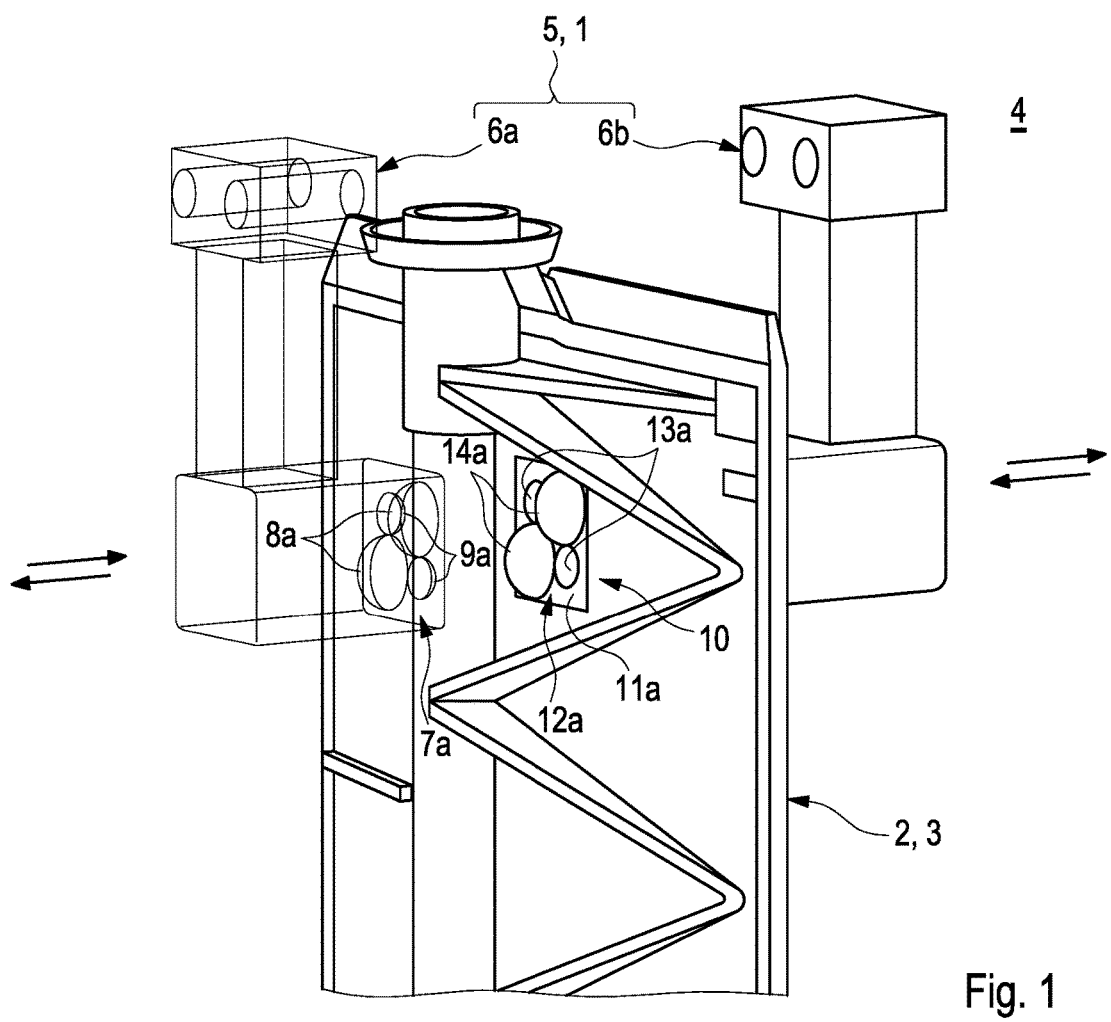
FIG. 1 shows a view of a gripping unit according to the invention and of a component according to the invention while establishing a releasable connection between the two.
Figure 2:
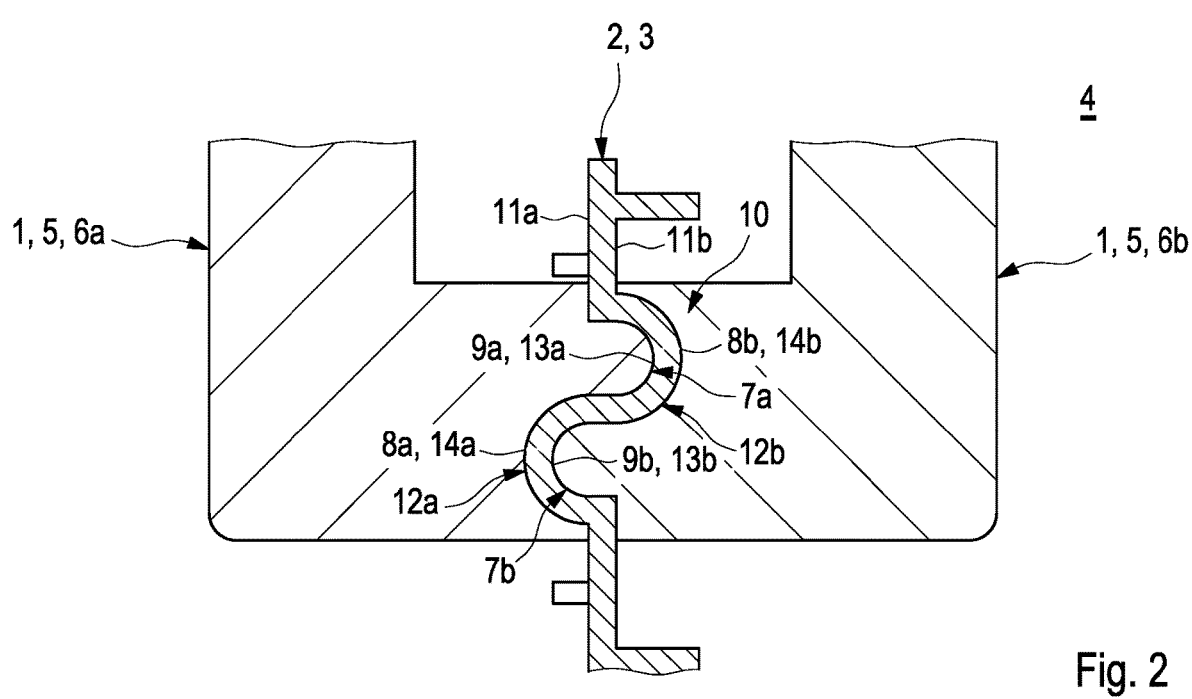
FIG. 2 shows a sectional view of the gripping unit and of the component during the established releasable connection.

FIG. 1 shows a view of a gripping unit 1 according to the invention and of a component 2 according to the invention. The component 2 in this exemplary embodiment is a flap 3 for controlling an air flow. Between the gripping unit 1 and the component 2, a connection 4 can be established and released. In FIG. 1, the connection 4 is released. FIG. 2 shows a sectional view of the gripping unit 1 and of the component 2, wherein the connection 4 is established here. Making reference to FIG. 1 and FIG. 2, the gripping unit 1 comprises an assembly gripper 5 with a first gripping finger 6a and with a second gripping finger 6b. The gripping finger 6a is shown partly transparently in FIG. 1. The gripping fingers 6a and 6b are axially moveable towards one another into a gripping position and axially away from one another into a released position—as indicated with arrows in FIG. 1. The released position of the gripping fingers 6a and 6b corresponds to the release connection 4, as shown in FIG. 1. The gripping position of the gripping fingers 6a and 6b corresponds to the established connection 4, as shown in FIG. 2. In the gripping position of the gripping fingers 6a and 6b, the component 2 is fixed between these in a form-fitting manner.

To this end, the first gripping finger 6a has a first gripping contour 7a and the second gripping finger 6a has a second gripping contour 7b. Here, the first gripping contour 7a comprises the recesses 8a and two projections 9a, which are each arranged diagonally to one another. In the same way, the gripping contour 7b comprises two recesses 8b and two projections 9b, which are each arranged diagonally to one another. The recesses 8a and 8b are axially recessed and the projections 9a and 9b project axially. As is visible in FIG. 2, the recesses 8a and 8b in the gripping position of the gripping fingers 6a and 6b are each arranged axially opposite the projections 9a and 9b and follow these at an interval. In other words, the first gripping contour 7a and the second gripping contour 7b have a constant interval relative to one another in the gripping position of the gripping fingers 6a and 6b.

The component 2 comprises a holding region 10, which in the gripping position of the gripping fingers 6a and 6b according to FIG. 2 is fixed between these in a form-fitting manner. In this exemplary embodiment, the holding region 10 is established separately and inserted in the component 2. Alternatively, the holding region 10 can also be formed integrally on the component 1. The shape of the component 2 in the holding region 10 in this case corresponds to the shape of a gap formed between the gripping fingers 6a and 6b. The interval of the gripping fingers 6a and 6b within the gripping contours 7a and 7b—or the width of the gap formed—correlates to the wall thickness of the component 2 in the holding region 10. In this exemplary embodiment, the interval between the gripping contours 7a and 7b—or the width of the gap formed—and accordingly the wall thickness of the component 2 in the holding region 10 is constant. Through the constant wall thickness, a distortion in the component 2 can be advantageously avoided. Here, the holding region 10 is relatively small in terms of area so that technical characteristic of the component 2—such as flow characteristics or noise characteristics of the flap 3 shown here—remain nearly unchanged.

In the holding region 10, a first counter contour 12a for the first gripping contour 7a is formed on a first side 11a. The first counter contour 12a is complementary to the first gripping contour 7a and accordingly comprises two recesses 13a and two projections 14a. In the gripping position, the first counter contour 12a lies against the first gripping contour 7a, so that the projections 14a axially engage in the recesses 8a and the projections 9a in the recesses 13a. On a second side 11b facing away from the first side 11a, a second counter contour 12b located opposite the first counter contour 12a is formed in the holding region 10. The second counter contour 12b is formed complementarily to the second gripping contour 7b and in the gripping position of the gripping fingers 6a and 6b lies against the same. Accordingly, the second counter contour 12b comprises two recesses 13b and two projections 14b which axially engage in the projections 9b and the recesses 8b. The respective recesses 8a, 8b, 13a, 13b and the respective projections 9a, 9b, 14a, 14b are semi-spherical in this exemplary embodiment, so that a canting of the component 2 in the assembly gripper 5 can be prevented and the assembly gripper 5 moreover be centred on the component 2 in a simplified manner.

Figure 3:
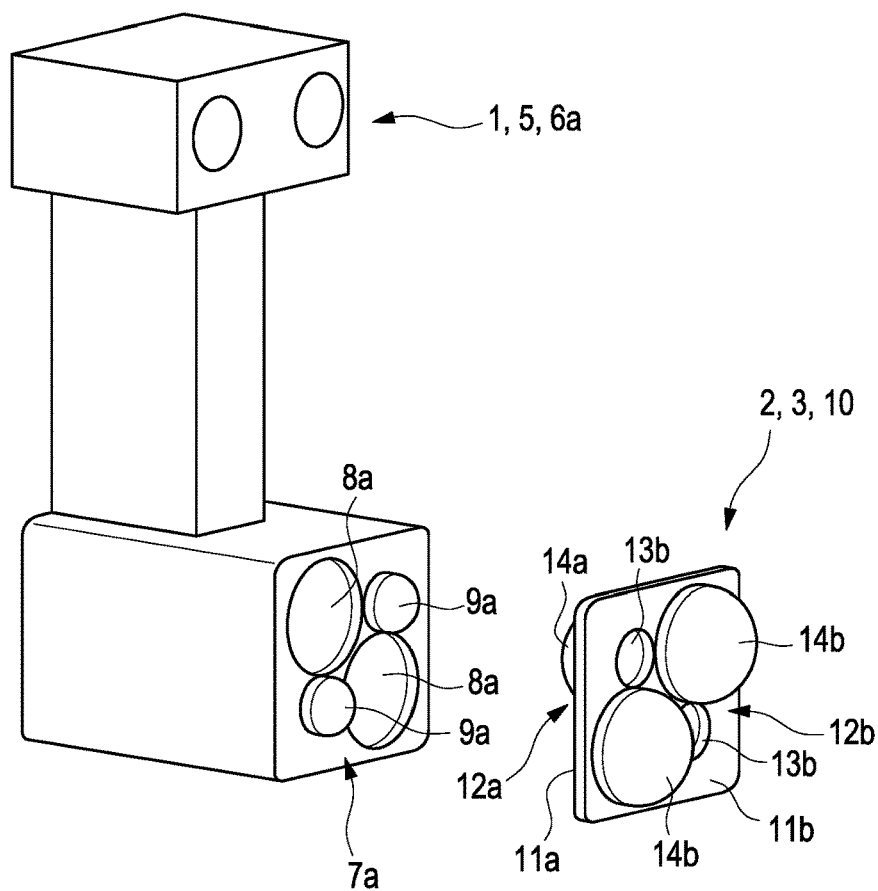
FIG. 3 shows a view of a gripping finger of the gripping unit and of a holding region of the component.
Figure 4:
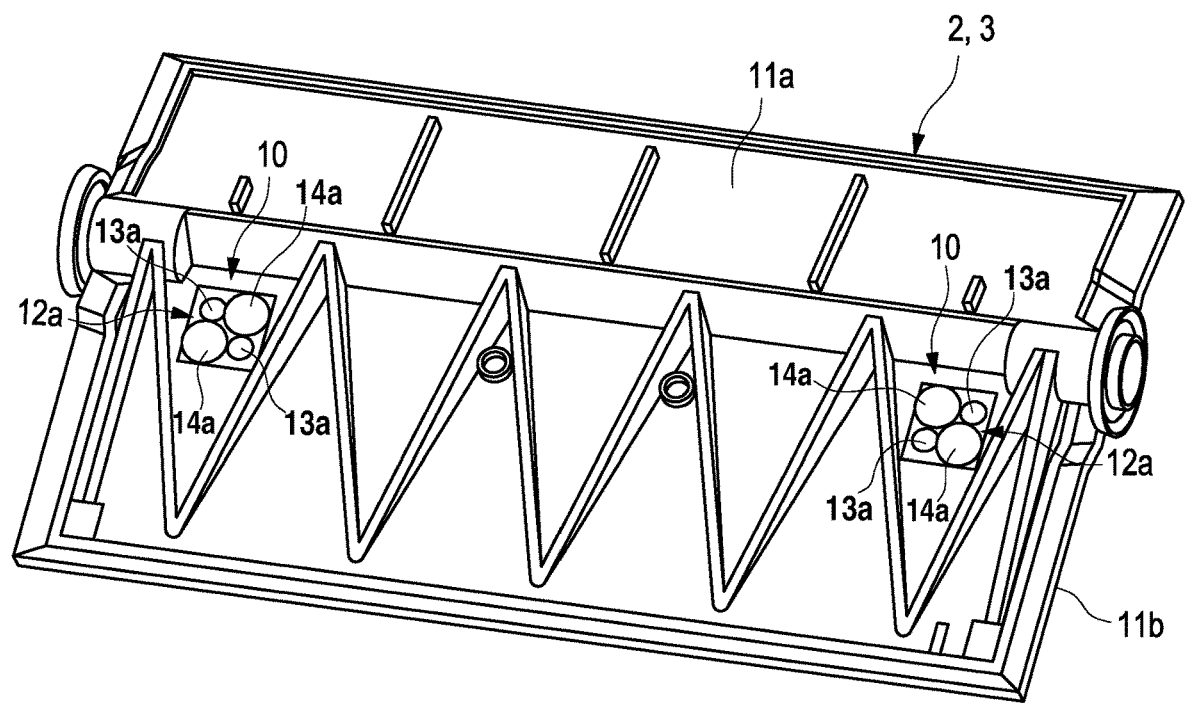
FIG. 4 shows a view of the component.

FIG. 3 shows a view of the first gripping finger 6a and of the holding region 10. FIG. 4 shows a view of the component 2 with holding regions 10 spaced apart from one another. The assembly, the component 2 can be gripped and assembled by two assembly grippers 5 of the gripping unit 1. Alternatively, the component 2 can be gripped and assembled by an assembly gripper 5 on the one or on the other holding region 10.

In summary, the force transmission into the component 2 can be improved in the releasable connection 4 and despite a low holding force of the gripping fingers 6a and 6b, a high assembly force transmitted to the component 2. Furthermore, the assembly gripper 5 can be centred on the component 2 in a simplified and precise manner, as a result of which position and angular tolerances during the assembly can be reduced. In addition, components 2 that are configured differently can be assembled in an automated manner by the same gripping unit 1 and the production costs thereby reduced. To this end, the holding regions 10 that are formed identically to one another can be provided on the differently configured components 2. The identity of the respective holding regions 10 relates to the configuration of the counter contours 12a and 12b, but the wall thickness in the respective holding region 10 can differ.

The invention claimed is:

1. A gripping unit for the automated assembly of a component having at least one holding region, comprising:
   at least one assembly gripper configured to grip the component in the at least one holding region;
   the at least one assembly gripper including two gripping fingers that are axially adjustable towards one another into a gripping position and axially adjustable away from one another into a released position;
   wherein, when the two gripping fingers are in the gripping position, the at least one holding region of the component is securable between the two gripping fingers, and when the two gripping fingers are in the released position, the at least one holding region of the component is releasable from the two gripping fingers;

wherein the two gripping fingers includes a first gripping finger and a second gripping finger, the first gripping finger including a first gripping contour and the second gripping finger including a second gripping contour, the first gripping contour and the second gripping contour structured complimentary to the at least one holding region of the component; and wherein, at least in regions, at least one of the first gripping contour and the second gripping contour at least one of axially projects from and is recessed in a corresponding one of the first gripping finger and the second gripping finger such that the at least one holding region of the component is securable between the two gripping fingers in a form-fitting manner when the two gripping fingers are in the gripping position.

2. The gripping unit according to claim 1, wherein, when the two gripping fingers are in the gripping position, the first gripping contour and the second gripping contour are arranged spaced apart from one another at a constant interval to facilitate gripping the component when the component, in the at least one holding region, has a constant wall thickness.

3. The gripping unit according to claim 1, wherein:
the first gripping contour and the second gripping contour each include at least one recess and at least one projection;
the at least one projection of the first gripping contour is disposed axially opposite the at least one recess of the second gripping contour; and
the at least one projection of the second gripping contour is disposed axially opposite the at least one recess of the first gripping contour.

4. The gripping unit according to claim 3, wherein at least one of the at least one recess of the first gripping contour, the at least one recess of the second gripping contour, the at least one projection of the first gripping contour, and the at least one projection of the second gripping contour is structured in at least one of a semi-spherical shape, a conical shape, a truncated cone-like shape, a pyramid-like shape, a cuboid shape, and a cylindrical shape.

5. The gripping unit according to claim 3, wherein:
the at least one recess of the first gripping contour includes two recesses arranged on the first gripping contour diagonally opposite one another;
the at least one projection of the first gripping contour includes two projections arranged on the first gripping contour diagonally opposite one another;
the at least one recess of the second gripping contour includes two recesses arranged on the second gripping contour diagonally opposite one another; and
the at least one projection of the second gripping contour includes two projections arranged on the second gripping contour diagonally opposite one another.

6. The gripping unit according to claim 3, wherein:
the first gripping contour further includes a first main surface, the at least one recess of the first gripping contour disposed in the first main surface, the at least one projection of the first gripping contour protruding from the first main surface; and
the second gripping contour further includes a second main surface, the at least one recess of the second gripping contour disposed in the second main surface, the at least one projection of the second gripping contour protruding from the second main surface.

7. The gripping unit according to claim 6, wherein:
the first main surface is structured complimentary to a first side surface of the at least one holding region; and
the second main surface is structured complimentary to a second side surface of the at least one holding region.

8. The gripping unit according to claim 7, wherein:
the at least one recess of the first gripping contour includes two recesses arranged on the first main surface diagonally opposite one another;
the at least one projection of the first gripping contour includes two projections arranged on the first main surface diagonally opposite one another;
the at least one recess of the second gripping contour includes two recesses arranged on the second main surface diagonally opposite one another; and
the at least one projection of the second gripping contour includes two projections arranged on the second main surface diagonally opposite one another.

9. A component for automated assembly via a gripping unit according to claim 1, comprising:
at least one holding region;
the at least one holding region, on a first side, including a first counter contour configured to interact with the first gripping contour;
the at least one holding region, on a second side facing away from the first side, including a second counter contour disposed opposite the first counter contour and configured to interact with the second gripping contour; and
wherein, at least in regions, at least one of the first counter contour and the second counter contour at least one of axially projects from and is recessed in the at least one holding region such that the at least one holding region is securable between the two gripping fingers in a form-fitting manner when the two gripping fingers are in the gripping position.

10. The component according to claim 9, wherein the first counter contour and the second counter contour are arranged spaced apart from one another at a constant interval such that the component, at least in the at least one holding region, has a constant wall thickness.

11. The component according to claim 9, wherein:
the first counter contour and the second counter contour each include at least one recess and at least one projection;
the at least one projection of the first counter contour is disposed axially opposite the at least one recess of the second counter contour; and
the at least one projection of the second counter contour is disposed axially opposite the at least one recess of the first counter contour.

12. The component according to claim 11, wherein the at least one recess of the first counter contour, the at least one recess of the second counter contour, the at least one projection of the first counter contour, and the at least one projection of the second counter contour is structured in at least one of a semi-spherical shape, a conical shape, a truncated cone-like shape, a pyramid-like shape, a cuboid shape, and a cylindrical shape.

13. The component according to claim 11, wherein:
the at least one recess of the first counter contour includes two recesses arranged on the first counter contour diagonally opposite one another;
the at least one projection of the first counter contour includes two projections arranged on the first counter contour diagonally opposite one another;

the at least one recess of the second counter contour includes two recesses arranged on the second counter contour diagonally opposite one another; and the at least one projection of the second counter contour includes two projections arranged on the second counter contour diagonally opposite one another.

14. The component according to claim 9, wherein the component is structured as a flap for controlling a fluid flow.

15. The gripping unit according to claim 1, wherein at least one of:

the first gripping contour, at least in regions, at least one of axially projects from and is recessed in the first gripping finger in a complimentary manner to a first counter contour, which at least one of axially projects from and is recessed in the holding region of the component; and the second gripping contour, at least in regions, at least one of axially projects from and is recessed in the second gripping finger in a complimentary manner to a second counter contour, which at least one of axially projects from and is recessed in the holding region of the component.

16. A releasable connection of a gripping unit and a component for the automated assembly of the component, the gripping unit including at least one assembly gripper configured to grip the component, the at least one assembly gripper including two gripping fingers that are axially adjustable towards one another into a gripping position where the component is securable between the two gripping fingers and axially adjustable away from one another into a released position where the component is releasable from the two gripping fingers, the two gripping fingers including a first gripping finger having a first gripping contour and a second gripping finger having a second gripping contour, the component having at least one holding region, the at least one holding region including a first counter contour and a second counter contour disposed opposite the first counter contour, the first counter contour structured complimentary to the first gripping contour, and the second counter contour structured complimentary to the second gripping contour, the releasable connection comprising:

the first gripping contour of the first gripping finger axially engaging in the first counter contour of the component and the second gripping contour of the second gripping finger axially engaging in the second counter contour of the component such that the component is secured between the two gripping finger in a form-fitting manner when the two gripping fingers are in the gripping position.

17. A gripping unit for automated assembly of components, comprising:

at least one assembly gripper configured to grip a component;

the at least one assembly gripper including two gripping fingers that are axially adjustable towards one another into a gripping position where the component is securable between the two gripping fingers and axially adjustable away from one another into a released position where the component is releasable from the two gripping fingers;

the two gripping fingers includes a first gripping finger and a second gripping finger, the first gripping finger including a first gripping contour and the second gripping finger including a second gripping contour;

wherein, at least in regions, at least one of the first gripping contour and the second gripping contour at least one of axially projects from and is recessed into a corresponding one of the first gripping finger and the second gripping finger;

wherein the first gripping contour and the second gripping contour are structured complimentary to a corresponding holding region of the component such that the component is securable between the two gripping fingers in a form-fitting manner when the two gripping fingers are in the gripping position;

wherein the first gripping contour and the second gripping contour each include at least one recess and at least one projection;

wherein the at least one projection of the first gripping contour is disposed axially opposite the at least one recess of the second gripping contour;

wherein the at least one projection of the second gripping contour is disposed axially opposite the at least one recess of the first gripping contour;

wherein the at least one projection of the first gripping contour and the at least one recess of the first gripping contour are structured differently from one another; and wherein the at least one projection of the second gripping contour and the at least one recess of the second gripping contour are structured differently from one another.

18. The gripping unit according to claim 13, wherein:

the at least one recess of the first gripping contour includes two recesses arranged on the first gripping contour diagonally opposite one another;

the at least one projection of the first gripping contour includes two projections arranged on the first gripping contour diagonally opposite one another;

the at least one recess of the second gripping contour includes two recesses arranged on the second gripping contour diagonally opposite one another; and the at least one projection of the second gripping contour includes two projections arranged on the second gripping contour diagonally opposite one another.

19. The gripping unit according to claim 18, wherein:

the two projections of the first gripping contour are structured differently than the two recesses of the first gripping contour; and the two projections of the second gripping contour are structured differently than the two recesses of the second gripping contour.

20. The gripping unit according to claim 18, wherein:

the two projections of the first gripping contour are structured differently than the two recesses of the second gripping contour; and the two projections of the second gripping contour are structured differently than the two recesses of the first gripping contour.

* * * * *